United States Patent
Gruschko et al.

(10) Patent No.: US 9,043,315 B2
(45) Date of Patent: May 26, 2015

(54) COOPERATIVE MODEL BETWEEN AN APPLICATION SERVER AND A DATABASE

(75) Inventors: Boris Gruschko, Heidelberg (DE); Christian Mohr, Heidelberg (DE); Martin Strenge, Nussloch (DE); Reiner Singer, Schriesheim (DE); Rolf Hammer, Karlsruhe (DE); Kai Baumgarten, Rauenberg (DE); Helmut Prestel, Bad Schoenborn (DE); Sigrid Wortmann, Heidelberg (DE); Thomas Elvers, Bensheim (DE); Veit Spaegele, Leimen (DE); Junhui Liu, Shanghai (CN); Yu Su, Shanghai (CN); Juan Ge, Shanghai (CN); Sebastian Seifert, Weinboehla (DE); Jianfeng Yan, Shanghai (DE); Philipp Grosse, Walldorf (DE); Christoph Weyerhaeuser, Heidelberg (DE)

(73) Assignee: SAP SE, Palo Alto, CA (US)

( * ) Notice: Subject to any disclaimer, the term of this patent is extended or adjusted under 35 U.S.C. 154(b) by 0 days.

(21) Appl. No.: 12/980,052

(22) Filed: Dec. 28, 2010

(65) Prior Publication Data
US 2011/0320439 A1  Dec. 29, 2011

Related U.S. Application Data

(60) Provisional application No. 61/334,996, filed on May 14, 2010.

(51) Int. Cl.
*G06F 17/30* (2006.01)

(52) U.S. Cl.
CPC ...... *G06F 17/30861* (2013.01); *G06F 17/3041* (2013.01); *G06F 17/30424* (2013.01)

(58) Field of Classification Search
CPC .................................................. G06F 17/3041
USPC ........................................ 707/732, 769, 779
See application file for complete search history.

(56) References Cited

U.S. PATENT DOCUMENTS

| | | | |
|---|---|---|---|
| 7,890,499 B1* | 2/2011 | Boswell | 707/722 |
| 2003/0051001 A1* | 3/2003 | Calvo et al. | 709/218 |
| 2004/0230571 A1* | 11/2004 | Robertson | 707/3 |
| 2007/0100807 A1* | 5/2007 | Abe et al. | 707/3 |
| 2010/0131491 A1* | 5/2010 | Lemaire et al. | 707/722 |
| 2011/0055231 A1* | 3/2011 | Huck et al. | 707/751 |
| 2011/0264667 A1* | 10/2011 | Harizopoulos et al. | 707/743 |

* cited by examiner

*Primary Examiner* — Khanh Pham
(74) *Attorney, Agent, or Firm* — Mintz Levin Cohn Ferris Glovsky and Popeo, P.C.

(57) ABSTRACT

Methods and apparatus, including computer program products, are provided for implementing a cooperative model between an application and a database. In one aspect, there is provided a computer-implemented method. The method may include receiving from an application a command to perform an operation at a database; accessing metadata representative of the application; configuring, based on at least the metadata, a result of the operation; and sending the configured result to shared memory accessible by the application. Related apparatus, systems, methods, and articles are also described.

15 Claims, 5 Drawing Sheets

COOPERATIVE MODEL BETWEEN AN APPLICATION SERVER AND A DATABASE

CROSS REFERENCE TO RELATED APPLICATION

This application claims the benefit under 35 U.S.C. §119 (e) of the following provisional application, which is incorporated herein by reference in its entirety: U.S. Ser. No. 61/334,996, entitled "Integrated Application Server and Data Server Processes Using Shared Memory," filed May 14, 2010.

FIELD

The present disclosure generally relates to data processing.

BACKGROUND

Database systems are commonly employed in computing systems to store and organize information. A database system may include a database and at least one application program for accessing the database. A database is typically considered to be a self-describing collection of records. Each record may be a representation of some physical or conceptual object that contains information. The information contained in a record may be organized based on attributes. For example, if a database were used to keep track of employees in a corporation, each record might include attributes such as a first name, last name, home address, and telephone number. Records in a database are typically accessed using a key included in the database system.

SUMMARY

In one aspect there is provided a method. The method may include receiving from an application a command to perform an operation at a database; accessing metadata representative of the application; configuring, based on at least the metadata, a result of the operation; and sending the configured result to shared memory accessible by the application.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
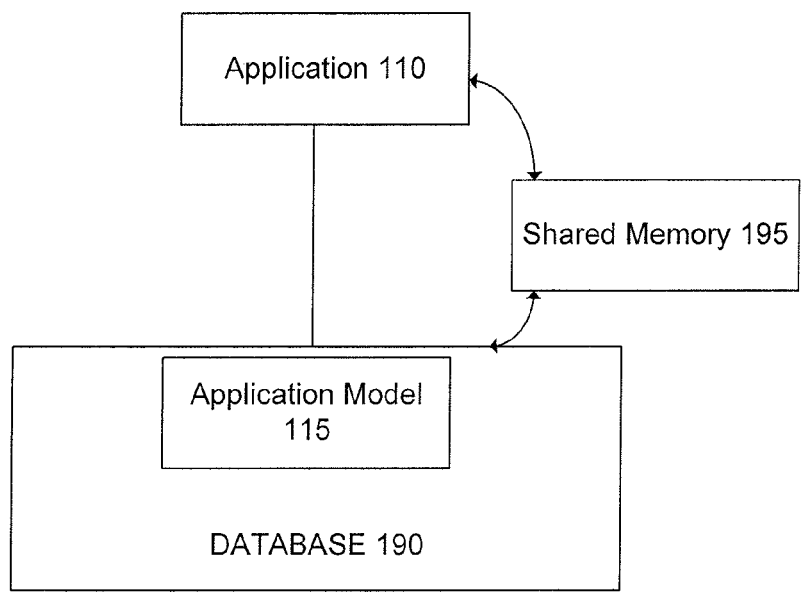
FIG. 1 depicts a block diagram of an example of a system for exchanging data in a format directly usable by the application.

Like labels are used to refer to same or similar items in the drawings.

DETAILED DESCRIPTION

FIG. 1 depicts a system 100 including an application 110, which accesses via shared memory 195 a database 190. The database 190 further includes a model 115 of the application 110. The subject matter described herein relates to data exchanges between the database 190 and the application 110 based on the model 115 and/or shared memory 195. The data exchanges are based on having (e.g., at, or accessible by, the database 190) a model 115 of the application 110, so that the data accessed (e.g., read, writes, copied, etc.) during the data exchanges are in a format directly usable by the application 110. Thus, the database 190 has the model 115 for the application 110 and provides data in accordance with the model 115.

The application 110 may be implemented as any type of application configured to handle data from database 190. The application 110 may be implemented on a computer (which includes at least one processor and at least one memory) having access to database 190. For example, the application 110 may be implemented as a browser, smart client application, and/or any other application. In addition, the application 110 may be configured to query data from database 190 and/or present data obtained from database 190. Although FIG. 1 only depicts a single application, a plurality of applications may be used as well. When this is the case, model 115 may include a plurality of models to enable data exchanges according to each model.

The shared memory 195 may be implemented as at least one memory. For example, the shared memory 195 may be implemented in memory rather than using disk-based storage, such as electromechanical disk storage and optical disks. Examples of implementations of shared memory 195 include cache, dynamic random access memory (DRAM), static random access memory, and the like.

The database 190 may be implemented as any type of database. However, in some implementations, the database 190 is implemented as an in-memory database. Rather than using disk-based storage, an in-memory database keeps most, if not all, of the relevant database data in main memory, such as dynamic random access memory (DRAM), static random access memory, etc.

Figure 2:
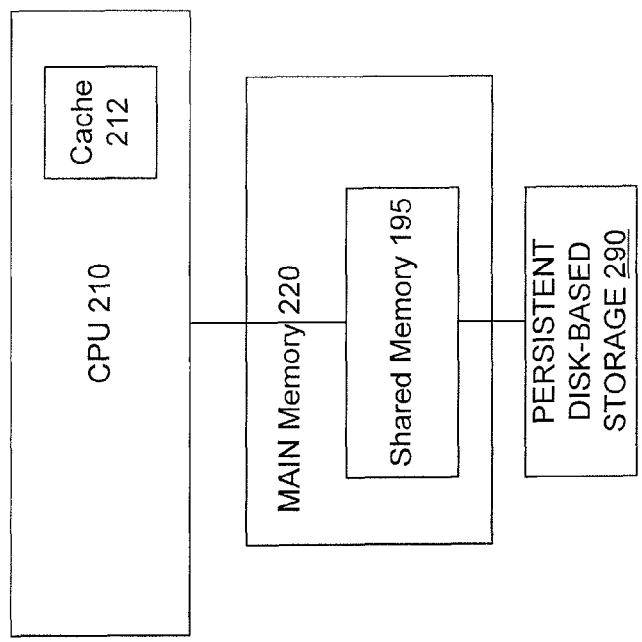
FIG. 2 depicts an example implementations of shared memory.

FIG. 2 depicts a system 200 including a central processing unit 210, cache 212, main memory 220, and persistent disk-based storage 290. The following description refers to FIGS. 1 and 2.

In the implementation of FIG. 2, main memory 220 further includes shared memory 195. In addition, the database 190 (e.g., the database management system application for database 190) and the relevant data for the database 190 are primarily maintained in main memory 220. In this example, queries from the application 110 are performed on data in main memory 220 rather than on data in disk-based storage 290. In some implementations, such use of main memory 220 reduces data access latency times by at least an order of about 200. Furthermore, the application 110 may also be hosted at system 200. When that is the case, the data exchanged between application 110 and database 190 may be via shared memory 195, which is contained within the main memory 220 used by both application 110 and database 195, which may result in further reduction in data access latency times.

The database 190 may also be implemented as a column-oriented database, although a row-oriented database may be used as well. A column-oriented database refers to a database management system configured to store relevant data based on columns, not rows. On the other hand, a row-oriented database refers to a database management system configured to store relevant data based on rows, not columns.

Figure 3:
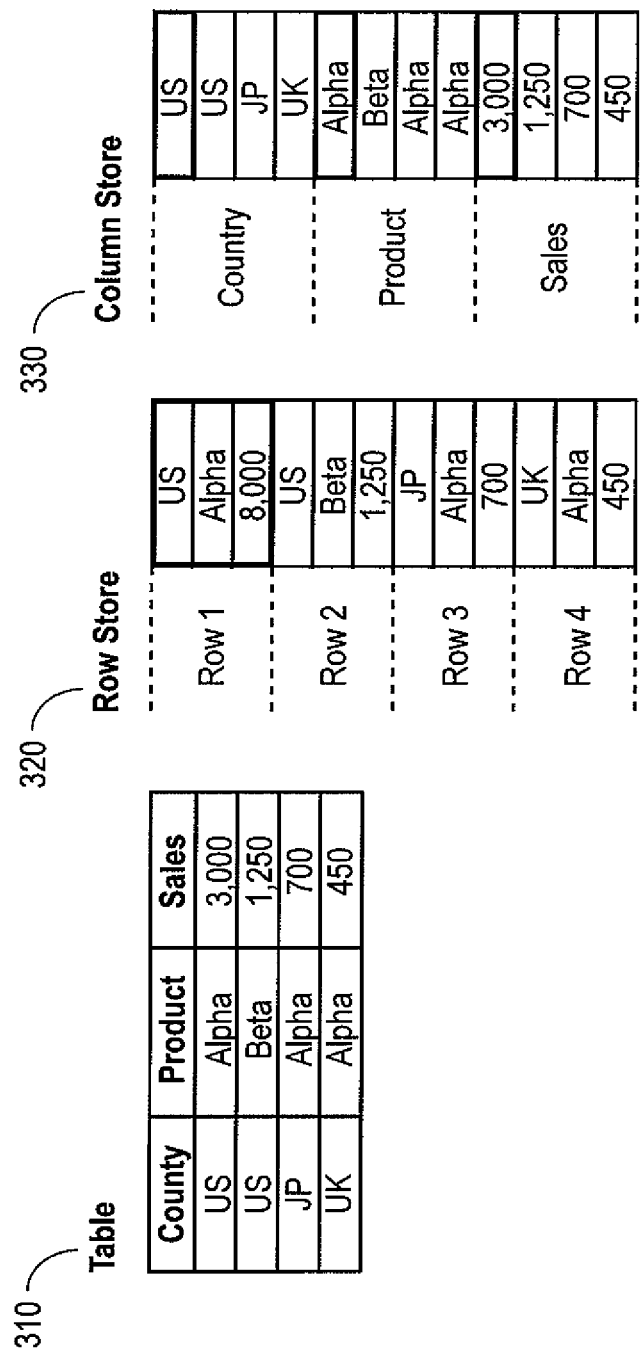
FIG. 3 depicts examples of column store and row store databases.

FIG. 3 depicts a table 310 including relevant data for country, product, and sales. In a row-oriented database, the relevant data is stored based on rows as depicted at row store 320; while in a column-oriented database, the relevant data is stored based on columns as depicted at column store 330.

Referring again to FIG. 1, in some implementations, system 100 may achieve faster data exchanges between the application 110 and the database 190 by also providing the model 115. The model 115 may define the data types used by application 110, the memory format/layout for data structures used by the application 110, conversions of types or fields required by the application, and/or other format needs of application 110. For example, if the application 110 is accustomed to operating with a row-based database, the model 115 defines the row structure used by the application 110. On the other hand, if the application 110 is expecting a column-based database, then the model 115 defines the column-based requirement. In some implementations, system 100 may provide performance enhancements in one or more of the following: a reduced number of type conversions; a reduced number of library calls (in the application process); a reduced number of method calls; a reduced number of process changes (roundtrips); a reduced number of memory copies; and an improved memory management within the application.

At least one of the application 110 or the database 190 may configure data placed in shared memory 195. The shared memory 195 may be used during the data exchanges between the application 110 and database 190, although other communication mechanisms may be used as well. Moreover, the placement of data into shared memory 195 may be based on model 115. For example, the format of the data placed in shared memory 195 may be in accordance with the requirements of application 110 as defined in model 115.

During a read from database 190, the application 110 may send a command, such as a SQL statement, to the database 190. For example, the application 110 may read data from the database 190 using a SQL statement/command, such as select <field-list> from <table> command. The application 110 (or model 115) may provide metadata describing the memory structure (e.g., layout) for the result of the command, such as the results of the SQL statement. For example, the metadata may define a line structure of a row table required by the application 110, such that the result of the command, or SQL statement, is written to shared memory 195 in the structure defined by the metadata.

Next, the database 190 executes the command, such as the SQL statement. For example, a query may be executed at database 190, which results in the generation of an internal query tree. Rather than sending the result of the query in a database-specific way to the application 110, the database 190 materializes the result directly into the shared memory 195 (or some other type of shared buffer).

Because the result of the query of database 190 is written into shared memory 190 in a format specifically for the application 110, the application 110 may accept the query result with little, or no, effort on the part of the application 110 (e.g., without further conversion). For example, in an implementation using ABAP at 110, the application 110 copies a portion of the result from shared memory 195 into an address space in memory used by application 110. In some implementations, the application 110 is R. The term R (which is available from http://www.r-project.org/) refers to a programming language and an environment/framework for providing an integrated suite of software components/functions for data manipulation, calculation, and graphical display, although mechanisms other than R may be used as well. For example, the application 110 may be the R programming framework executing an R script, such that the application 110 (which in this example is R environment) may access shared memory 195 when accessing and/or receiving information from the database. Specifically, a client library may integrate the result of the query into a data set by bypassing the R internal garbage collection and registering the data in shared memory 195 directly as if the data would be in a normal R address space.

When a large data exchange occurs, the application 110 may send massive amount of data to the database 190. For example, application 110 may send a massive amount of data as part of a mass insert or a mass update and/or upset Rather than referencing in a SQL command the massive data amount field-wise (e.g., row-wise or column-wise), the application 110 may send a brief SQL statement to the database 190, and the SQL command may separately reference the massive data amount being sent. In this example, the application 110 may provide metadata describing the memory layout of the additional data. This metadata may be handled and/or stored by model 115. In implementations using ABAP at 110, the metadata may include, for example, the line structure of a row table including low-level data types and offsets. In the case of R, the metadata are an implicit part of the data structure placed in shared memory describing R objects such as vectors or data frames (e.g., R table objects). The metadata resemble the internal data structures of R, which are complex data structures similar to special vector or table implementations. The application 110 then provides the data, which is used directly by the database 190 to execute the SQL statement.

Figure 4:
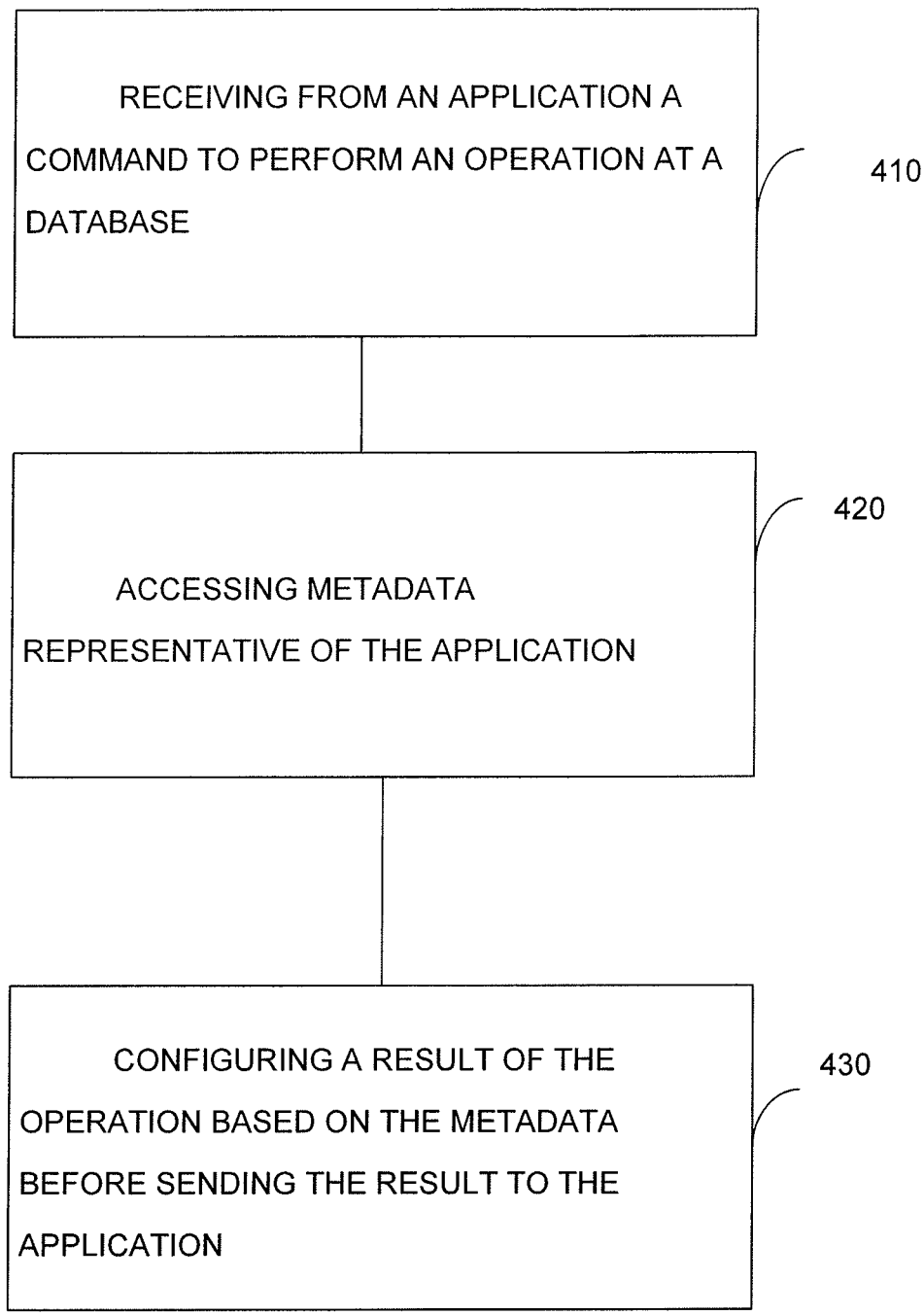
FIG. 4 depicts a process for exchanging data in a format directly usable by the application.

FIG. 4 depicts a process 400 using a model and/or shared memory.

At 410, a command may be received from an application. For example, application 110 may send (either directly to database 190 or via shared memory 195) a command, such as a SQL command to database 190. The command may correspond to an operation at database 190, such as a select statement or any other operation.

At 420, metadata may be accessed representative of the application. For example, model 115 may provide metadata, such as definitions of the data types used by application 110, the memory format/layout for data structures used by the application 110, conversions of types or fields required by the application 110, and/or other format needs of application 110.

At 430, the results of the operation are configured based on the metadata. For example, the results of a select statement performed on database 190 are configured in accordance with the accessed metadata, and then the configured results data is provided to (e.g., sent to application 110 and/or shared memory 195). Examples of configuring data in accordance with metadata include converting data types or fields used by application 110, configuring the memory format/layout for data structures used by the application 110, writing data into shared memory in a format required by application 110, and/or any other format needs of application 110.

At 435, the application access shared memory to obtain the configured results. For example, application 110 may access shared memory 195 to obtain the results configured in accordance with the metadata, such that the application 110 performs little, if any, conversion of the results configured in accordance with the metadata.

Figure 5:
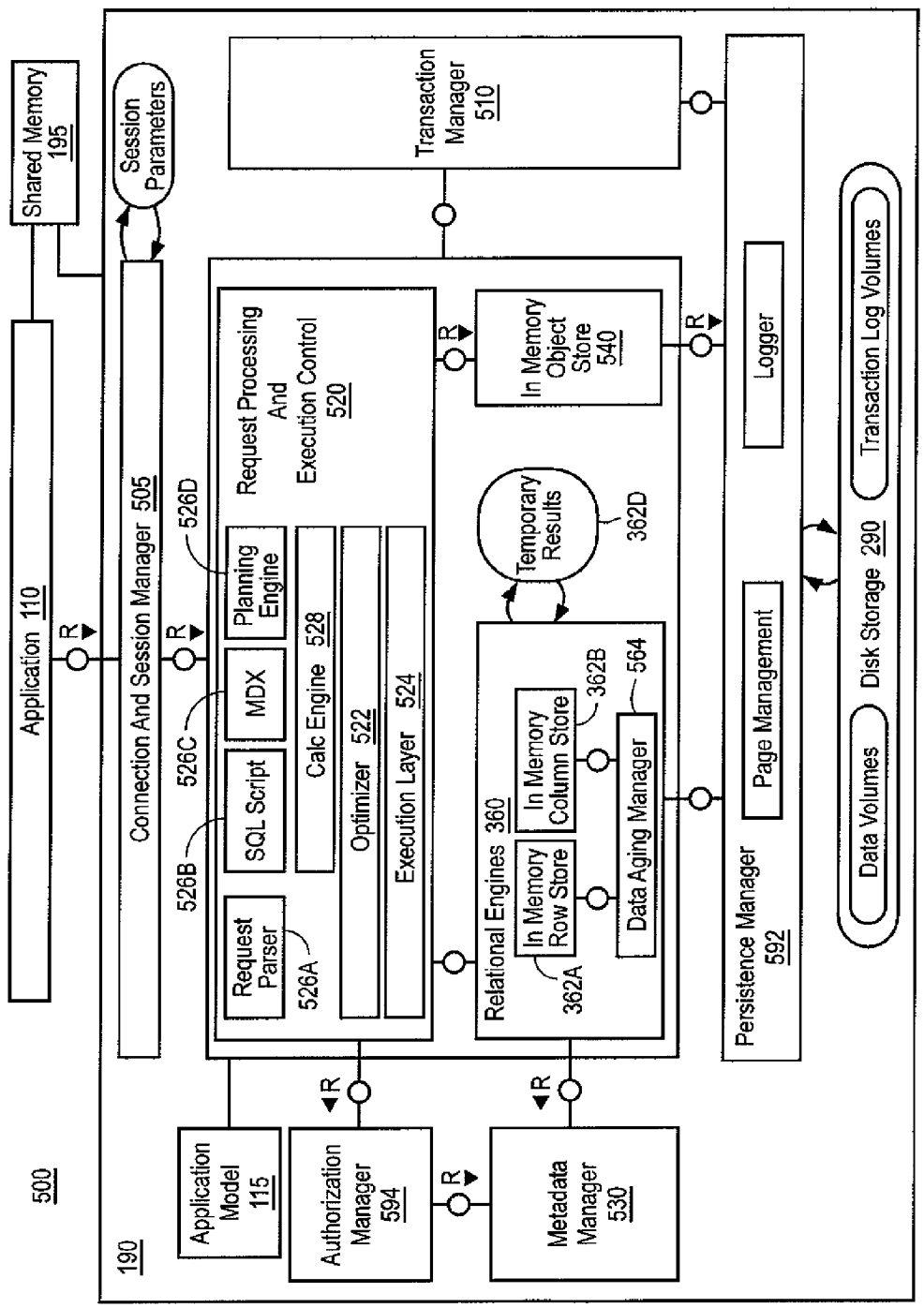
FIG. 5 depicts a block diagram of an example of another system for exchanging data in a format directly usable by the application.

FIG. 5 depicts a system 500 that is similar in some ways to system 100 including application model 115 and shared memory 195 coupled to application 110 and database 190 but system 500 includes additional elements as depicted at FIG. 5 and described further below.

The application 110 couples to database 190 via a connection and session manager 505. The connection and session manager 505 creates and manages sessions and connections for database clients, such as application 110. For each session, the connection and session manager 505 maintains a set of parameters for the connection and/or session. Once a session is established, the application 110 may send commands, such as SQL statements, multidimensional expression (MDX) statements, and the like, to access database 190.

A command received at database 190 is processed in the context of a transaction. The transaction manager 510 coordinates database transactions, controls transactional isolation, keeps track of running transactions, and keeps track of closed transactions. When a transaction is committed or rolled back, the transaction manager 510 informs those components of system 100 involved in the transaction so that the components can execute any necessary actions.

The commands received from application 110 are analyzed and executed by a request processing and execution control (RPEC) component 520. The RPEC 520 includes a request parser for analyzing the command received from application 110 (e.g., a SQL statement and/or an MDX statement received from application 110) and dispatches the command (or corresponding requests) to another element within database 190. For example, transaction control statements are forwarded to the transaction manager 510, data definition statements are dispatched to the metadata manager 530, and object invocations are forwarded to object store 540. Data manipulation statements may be forwarded to the optimizer 522 for creating an optimized execution plan, which is then given to the execution layer element 524. The execution layer element 524 acts as the controller that invokes the different engines 362A and 362B and routes any intermediate results to another portion of the execution process.

The database 190 may also include domain-specific portions, such as a financial planning engine 526D. In addition, the database 190 may include scripting, such as for example, SQL scripting 526B that enables running application-specific calculations inside database 190. The SQL script 526B may be configured for optimizations and parallelization of SQL statements. RPEC 520 may also be configured to support multidimensional queries via MDX component 526C.

The planning engine 526C may provide financial planning applications to execute basic planning operations in the database 190. For example, planning engine 526C may allow creation of a new version of a data set as a copy of an existing data set while applying filters and transformations. In this example, planning data for a new year is created as a copy of the data from the previous year by filtering by year and updating the time dimension.

The SQL script 526B, MDX 526C, and planning engine 526D are implemented using a calculation engine 528, which provides a common infrastructure for SQL script 526B, MDX 526C, and planning engine 526D.

Metadata may be accessed via the metadata manager 530. The metadata may include a variety of objects. Examples of metadata include the definition of relational tables, the definition of columns, the definition of views at application 110, the definition of indexes, the definition of SQL script functions, and object metadata. Metadata of all these types may be stored in one common catalog accessible by components of system 500 regardless of whether the store is in-memory row store, in-memory column store, object store, disk based, etc. The database 190 may also support multi-version concurrency control and multiple tenants, some of which may share common data and some of which may have separate tenant-specific data.

The database 190 may include one or more relational database engines 360 operative with in-memory row store 362A and/or in-memory column store 362B, although disk based databases may be used as well. The in-memory row store 362A is a relational in-memory database engine that stores data in a row based way. The in-memory column store 362B is a relational column based in-memory database engine. Although most, if not all, of the relevant data handled by database 190 is stored in-memory, some data may be stored on a disk-based storage device (e.g., data that has aged and is no longer in use or tracing data). Data in disk-based storage, such as disk storage 290, is primarily stored on disk and only moved in-memory when accessed.

When a database table is created, database 190 specifies where it is stored, e.g., whether the table is stored in row, column, disk, or a combination of row, column, and disk. Moreover, database 190 may allow tables from different stores to be combined using one statement (e.g., a join, a sub query, a union, etc.).

As row-based tables and column-based tables may be combined in one SQL statement, the corresponding engines 362A-B consume intermediate results cached in 362D. A difference between the row-based and column-based database engines 362A-B is the way the engines process data. For example, row store operators process data one row-at-a-time using iterators, and column store operations (such as scan, aggregate and so on) require that an entire column of data be available in contiguous memory locations. To exchange intermediate results at 362D, row store 362A can provide results to column store 362B materialized as complete rows in memory, while column store can expose results using the iterator interface needed by row store 362A.

The object store 540 is an in-memory store for graph-like structures represented by networks of objects. The object store 540 may be used to optimize and plan tasks that operate on large volumes of graph-like data, such as supply chain management data.

The data aging manager 564 is used to manage the movement of data from in-memory mechanisms to persistent, disk based storage 290. For example, the data aging manager 564 may regard data as aged if it is no longer needed during normal business (which includes transactional processing as well as reporting use cases), if the data is rarely accessed, or a significant amount of time has passed since being accessed. When this is the case, the data aging manager 564 may move the data from memory to disk storage 290.

The persistence manager 592 manages the durability and atomicity of transactions. For example, the persistence manager 592 ensures that the database 190 is restored to the most recent committed state after a restart and that transactions are either completely executed or completely undone. The persistence manager 592 also provides interfaces for writing/reading data, and contains a logger for managing a transaction log.

The database 190 may also include an authorization manager 594, which is invoked by other components of system 500 to check whether a user has the required privileges to execute a requested operation. A privilege grants a right to perform a specified operation (such as create, update, select, execute, and so on) on a specified object (for example a table, a view, a SQL Script function, and so on). Users may also be authenticated via for example a login with user identification and password.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure a processor to perform operations comprising:
   receiving, at an in-memory database, a command to perform an operation at the in-memory database, wherein the in-memory database further comprises a column-store database, wherein the received command is received from the application via shared memory, wherein the shared memory includes shared access to enable the application and the in-memory database to access content in the shared memory;
   accessing, by the in-memory database, metadata representative of the application, wherein the metadata includes a model of the application to enable a column-based format result from the in-memory database to be configured in a row-based format result required by the application;
   configuring, based on at least the metadata, the column-based format result of the operation into the row-based format result required by the application; and
   sending, by the in-memory database, the configured row-based format result required by the application to the shared memory to enable access by the application.

2. The non-transitory computer-readable medium of claim 1, wherein the in-memory database, the application, and the shared memory are implemented in the same memory unit.

3. The non-transitory computer-readable medium of claim 1, wherein the command implements at least one of a query, a select, a create, a read, a copy, and a write.

4. The non-transitory computer-readable medium of claim 1, wherein the model defines at least one of a data type implemented by the application, a memory format of a data structure implemented by the application, a row structure implemented by the application, and a column structure implemented by the application.

5. The non-transitory computer-readable medium of claim 1 further comprising:
   sending the configured row-based format result to the application.

6. A method comprising:
   receiving, at an in-memory database, a command to perform an operation at the in-memory database, wherein the in-memory database further comprises a column-store database, wherein the received command is received from the application via shared memory, wherein the shared memory includes shared access to enable the application and the in-memory database to access content in the shared memory;
   accessing, by the in-memory database, metadata representative of the application, wherein the metadata includes a model of the application to enable a column-based format result from the in-memory database to be configured in a row-based format result required by the application;
   configuring, based on at least the metadata, the column-based format result of the operation into the row-based format result required by the application; and
   sending, by the in-memory database, the configured row-based format result required by the application to the shared memory to enable access by the application, wherein at least one processor performs the receiving, the accessing, the configuring, and the sending.

7. The method of claim 6, wherein the in-memory database, the application, and the shared memory are implemented in the same memory unit.

8. The method of claim 6, wherein the command implements at least one of a query, a select, a create, a read, a copy, and a write.

9. The method of claim 6, wherein the model defines at least one of a data type implemented by the application, a memory format of a data structure implemented by the application, a row structure implemented by the application, and a column structure implemented by the application.

10. The method of claim 6 further comprising:
sending the configured row-based format result to the application.

11. A system comprising:
at least one memory; and
at least one processor, wherein the at least one processor and the at least one memory are configured to provide operations comprising:
receiving, at an in-memory database, a command to perform an operation at the in-memory database, wherein the in-memory database further comprises a column-store database, wherein the received command is received from the application via shared memory, wherein the shared memory includes shared access to enable the application and the in-memory database to access content in the shared memory;
accessing, by the in-memory database, metadata representative of the application, wherein the metadata includes a model of the application to enable a column-based format result from the in-memory database to be configured in a row-based format result required by the application;
configuring, based on at least the metadata, the column-based format result of the operation into the row-based format result required by the application; and
sending, by the in-memory database, the configured row-based format result required by the application to the shared memory to enable access by the application, wherein at least one processor performs the receiving, the accessing, the configuring, and the sending.

12. The system of claim 11, wherein the in-memory database, the application, and the shared memory are implemented in the same memory unit.

13. The system of claim 11, wherein the command implements at least one of a query, a select, a create, a read, a copy, and a write.

14. The system of claim 11, wherein the model defines at least one of a data type implemented by the application, a memory format of a data structure implemented by the application, a row structure implemented by the application, and a column structure implemented by the application.

15. The system of claim 11 further comprising:
sending the configured row-based format result to the application.

* * * * *